Patented Feb. 5, 1946

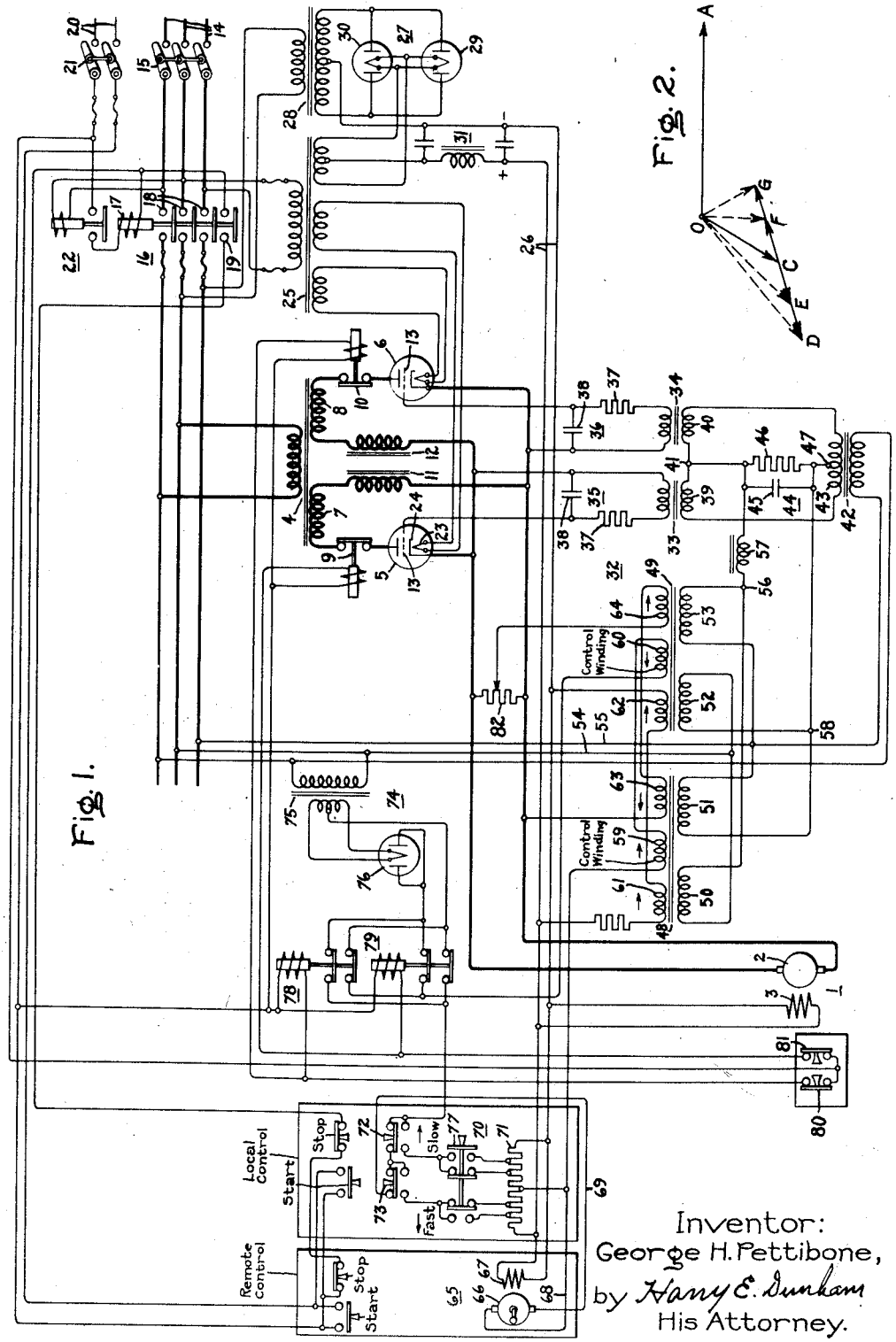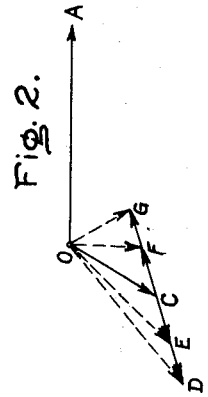

2,394,100

UNITED STATES PATENT OFFICE 2,394,100

ELECTRIC MOTOR CONTROL SYSTEM

George H. Pettibone, Scotia, N. Y., assignor to General Electric Company, a corporation of New York Application June 14, 1940, Serial No. 340,493

9 Claims. (Cl. 172—179)

My invention relates to electric motor control systems and more particularly to electric valve motor control systems.

It is frequently desirable in the control of dynamo-electric machines to use apparatus which controls the energization of a dynamo-electric machine, such as a motor, accurately and rapidly in response to a predetermined controlling influence such as a control voltage. In accordance with the teachings of my invention described hereinafter, I provide an electric valve motor control system which rapidly and precisely controls an operating condition such as the speed of a dynamo-electric machine.

It is an object of my invention to provide a new and improved electric motor control system.

It is another object of my invention to provide a new and improved electric valve motor control system for controlling the speed and direction of rotation of a motor.

It is a further object of my invention to provide a new and improved electric valve motor control system wherein the speed and direction of rotation of the motor is precisely controlled in response to the magnitude and the polarity of a control voltage.

Briefly stated, in the illustrated embodiment of my invention I provide electric valve translating apparatus for controlling the speed and direction of rotation of a direct current motor by controlling the magnitude and polarity of the average current transmitted to the armature of the motor. The electric valves are provided with grids which control the average current conducted thereby. I also provide an excitation circuit for impressing on the grids, variable phase alternating voltages to control the polarity of the average current transmitted by the electric valve translating apparatus. The excitation or control circuits comprise a pair of saturable reactors constituting a bridge circuit or network to produce the variation in phase of the voltages impressed on the grids. The reactances are controlled in response to a predetermined controlling influence, such as the output voltage of a direct current control generator. The reactances are also provided with windings responsive to the magnitude of the voltage impressed across the armature of the motor to assist or accelerate the effect of the reactances under varying or changing conditions dictated by the output voltage of the control generator.

For a better understanding of my invention, reference may be had to the following description taken in connection with the accompanying drawing, and its scope will be pointed out in the appended claims. Fig. 1 of the accompanying drawing diagrammatically illustrates an embodiment of my invention as applied to an electric valve system for controlling the speed and direction of rotation of a direct current motor. Fig. 2 diagrammatically represents certain operating characteristics of the arrangement shown in Fig. 1.

Referring to Fig. 1 of the drawing, I have there illustrated my invention as applied to a system for controlling the speed and direction of rotation of a dynamo-electric machine, such as a direct current motor I having an armature winding 2 and a field winding 3. The magnitude and the polarity of the average current transmitted to the armature 2 of the motor I and, hence, the speed and direction of rotation of the motor I are controlled by means of electric translating apparatus comprising a transformer 4 and a pair of electric valves 5 and 6. Transformer 4 comprises secondary windings 7 and 8 which are connected to electric valves 5 and 6, respectively, through suitable relays or contactors 9 and 10, respectively, which may be termed limit contactors. These contactors limit the region throughout which the motor I may effectively operate or position a driven object (not shown). Suitable smoothing reactances 11 and 12 may be connected in series relation with the electric valves 5 and 6. It will be noted that the electric valves 5 and 6 are connected to conduct current in opposite directions through the armature 2 of motor 1. Electric valves 5 and 6 are preferably of the type employing an ionizable medium, such as a gas or a vapor, and each comprises a control member or grid 13.

The translating apparatus may be energized from a suitable source of alternating current 14 through a suitable switch 15 and a contactor 16 having an actuating coil 17, power contacts 18 and interlocking contacts 19. A suitable alternating current control circuit 20 may be connected to the system through a hand-operated control switch 21 and a control relay, preferably a time delay relay, 22, may be employed to delay the energization of the actuating coil 17 of contactor 16 a predetermined time after the closure of switch 15 in order that the cathode heating elements of associated electric valves 5 and 6 may attain safe minimum operating temperatures. Cathode heating elements 23 associated with cathodes 24 of electric valves 5 and 6 may be energized from circuit 14 through a transformer 25.

I also provide a suitable source of direct current 26 which may be supplied by a rectifier 27 comprising transformer 28 and a pair of electric valves 29 and 30 which energize the circuit 26 through a filter circuit 31. The cathodes of electric valves 29 and 30 may be energized from a secondary winding of transformer 25, if desired.

I provide an excitation circuit 32 for impressing on the grids 13 of electric valves 5 and 6 alternating voltages of adjustable phase position relative to the voltage of circuit 14, in order to control the magnitude and polarity of the average current transmitted to armature 2 of motor 1 and thereby to control the speed and direction of rotation of this motor. The excitation circuit 32 comprises transformers 33 and 34, associated with the grids 13 of electric valves 5 and 6, and suitable filter circuits 35 and 36 including resistances 37 and capacitances 38. Primary windings 39 and 40 of transformers 33 and 34 may be connected to provide a neutral connection 41, and are connected to a secondary winding 43 of transformer 42. Transformer 42 introduces into the excitation circuit 32 an alternating biasing voltage. This biasing voltage may have a phase displacement of substantially 120 electrical degrees lagging with respect to the anode-cathode voltage of the electric valves 5 and 6 and, as shown in the specific embodiment of my invention, the primary winding of transformer 42 may be energized from a phase of circuit 14 different from that which energizes the electric valves 5 and 6, thereby obtaining this phase displacement.

Excitation circuit 32 also includes two saturable inductive reactances 48 and 49 comprising alternating current windings 50, 51 and 52, 53, respectively, which form or constitute branches of a bridge circuit or network. These windings are energized from one phase of the alternating current circuit 14 through conductors 54 and 55. Windings 50—53 are arranged so that windings 50 and 51 constitute opposite branches of the inductive network, and windings 52 and 53 constitute the other opposite branches of the bridge network. The output of the bridge at the common junctures 56 and 58 is connected to a filter circuit 44 comprising an inductance 57 connected in series with a parallel connected capacitor 45 and resistor 46. The filter removes harmonics from the wave form of the bridge output.

In order to vary the inductive reactance of the alternating current windings and to produce thereby an alternating voltage at the output circuit 44, reactances 48 and 49 are provided with control windings 59 and 60, respectively. Reactances 48 and 49 are also provided with direct current magnetization windings 61 and 62, respectively, which are connected to circuit 26 and are thereby energized with constant current to establish a constant unidirectional magnetization in the core members of the associated reactances. Winding 59 of reactance 48 is connected to assist winding 61 for one direction of energization thereof, whereas winding 60 of reactance 49 is arranged to oppose winding 62 for the same direction of energization. This effect causes the inductance of one set of alternating current windings 51 and 50 to be increased when the inductance of the other set of alternating current windings 52 and 53 is decreased. This results in an unbalanced bridge and a voltage is produced at 44. When the direction of magnetization is reversed and the inductance effect is reversed, the phase of the output is reversed. Reactances 48 and 49 are also provided with second control windings 63 and 64, respectively, which serve as forcing or accelerating windings to assist in controlling the effect of windings 59 and 60, respectively. The windings 63 and 64 are arranged and energized so that the magnetomotive force thereby produced is at all times less than the magnetomotive force furnished by windings 59 and 60. Windings 63 and 64 produce opposite effects on the fixed excitation in windings 61 and 62 but also oppose the excitation of the control windings 59 and 60. During changing conditions, that is during variations in the energization of windings 59 and 60, windings 63 and 64 assist that change and cause the motor 1 to respond more readily to the control effect introduced by variations in the energization of windings 59 and 60.

As a means for controlling reactances 48 and 49 to control the voltage introduced into circuit 32, I employ a suitable controlling means, such as a direct current generator 65 which comprises an armature 66 and a field winding 67 which may be energized from circuit 26. Generator 65 may be of the hand-operated or hand-cranked type to produce a control voltage the polarity of which is determined by the direction of rotation of the armature 66. The conductors 68 and 69, connected to the armature 66, are connected to control windings 59 and 60.

When it is desired to control the operation of motor 1 without using the hand-operated generator 65, I provide a control circuit 70 including a resistance 71 connected across the terminals of the field windings 67 and connected to the armature circuit of the generator 65. Circuit 70 includes hand-operated devices, such as hand-operated switches 72 and 73 which when depressed operate the motor 1 to the right or to the left, depending upon which switch is depressed. When either switch 72 or 73 is depressed, the armature circuit of generator 65 is opened and there is introduced into the control circuit of windings 59 and 60 current from the potential drop across the part of resistor 71 connected to the windings.

If desired, local and remote control stations may be connected in the control circuit to start or stop the operation of the system. That is, the push buttons of these stations energize and deenergize the actuating coil 17 of contactor 18. Circuit 70 may also comprise a suitable control switch 77 to connect difference amounts of resistance 71 operatively in the circuit, thereby to control the amount of energization of control windings 59 and 60 and obtain either fast or slow operation of the motor 1. When switch 77 is moved to the left-hand position, the operation of the motor is at a high rate, whereas when switch 77 is moved to the right-hand position, the operation is at a slow rate.

Limit control relays 78 and 79 having contacts in circuit with control windings 59 and 60 may also be provided to establish limits of the region throughout which a driven object (not shown) may be operated by motor 1. Hand-operated switches 80 and 81 may be connected in circuit with the actuating coils of relays 78 and 79, and contactors 9 and 10, respectively, to actuate these relays manually at desired times.

The second control windings 63 and 64 are preferably energized in response to a predetermined electrical condition of the motor 1, such as the voltage impressed across the armature 2. Windings 63 and 64 may be connected to be responsive to the voltage of armature 2 by employing a voltage divider 82 connected across the armature circuit. By virtue of this connection, windings 63 and 64 operate as forcing or accelerating windings to assist in the change of operating conditions dictated by the output voltage of generator 65.

The operation of the embodiment of my invention shown in the drawing will be explained by considering the system when it is desired to control the speed and direction of rotation of motor 1 by means of the hand-cranked generator 65. The motor 1 is rotated in one direction by cranking the generator 65 in one direction, and the motor is operated in the opposite direction by reversing the direction of rotation of generator 65.

Inasmuch as electric valves 5 and 6 are connected to conduct current in opposite directions through armature 2 of motor 1, the polarity of the average direct current transmitted to armature 2 is determined by that electric valve which is conducting current during the larger portion of its positive half cycle of applied anode-cathode voltage. When both electric valves 5 and 6 conduct current for equal intervals of time during the respective positive half cycles of applied anode-cathode voltage, the resultant average current transmitted to armature 2 is zero and consequently the motor 1 will be at standstill. If one of the electric valves, such as electric valve 5, conducts current for a greater period of time than electric valve 6, the motor will be rotated in one direction, and if the electric valve 6 conducts current for a greater interval of time than electric valve 5, the motor will be rotated in the reverse direction.

The system is initiated in its operation by closing switches 15 and 21. A predetermined time after the closure of switch 15, the time delay relay 22 closes its contacts effecting energization of actuating coil 17 and thereby closing the main contacts 18 and closing the interlocking contacts 19. The system is then in condition for operation. The resultant voltage impressed on the grids 13 of electric valves 5 and 6 is the resultant of two alternating components of voltage, one furnished by transformer 42 and the other furnished by windings 50—53 of reactances 48 and 49 which constitute the branches of a bridge network. The system is adjusted so that when the generator 65 is at standstill, the electric valves 5 and 6 conduct equal amounts of current so that the motor 1 is also maintained at standstill. Variations in the energization of control windings 59 and 60, occasioned by rotation of the armature 66 of generator 65, shift the phase of the voltage introduced into excitation circuit 32 by reactances 48 and 49. For one direction of rotation of the armature 66, the voltage introduced in circuit 32 increases the conductivity of one valve of electric valves 5 and 6, and for the opposite direction of rotation the shift in phase of control voltage is such as to increase the conductivity of the other electric valve. The effect of the second control windings 63 and 64 is less than the effect of the control windings 59 and 60. Inasmuch as windings 63 and 64 are connected to be responsive to the armature voltage of motor 1, the energization of windings 63 and 64 lags the output voltage or armature voltage of generator 65, thereby to force or accelerate the effect or change of conditions dictated by windings 59 and 60.

The operation of the excitation circuit 32 may be more fully appreciated by referring to the operating characteristics shown in Fig. 2 where the vectors represent the anode-cathode voltage and the grid voltage for one of the electric valves, such as electric valve 5. Vector OA represents the anode-cathode voltage and vector OC represents the fixed component of voltage provided by the left-hand portion of secondary winding 43 of transformer 42 and which is displaced substantially 120 electrical degrees with respect to the vector OA. For one direction of rotation of the hand-cranked generator 65, the voltage appearing across resistance 42 will be of one phase relation, and for the opposite direction of rotation the voltage appearing across this resistance will be of the opposite phase relation. Furthermore, as the speed of the generator 65 varies for a particular direction of rotation, the magnitude of the voltage appearing across resistance 46 also varies. For example, for one direction of rotation the voltage appearing across resistance 46 will have the direction of vector CD, and for the opposite direction of rotation the voltage appearing across resistance 46 will have the direction of vector CG. The magnitude of the voltage appearing across resistance 46 depends upon the speed of rotation of the generator 65 and may assume magnitudes corresponding to vectors CE and CD. For the opposite direction of rotation this voltage may be represented by CF and CG. Vector OC represents the magnitude of the voltage impressed on grid 13 of electric valve 5 when the generator 65 is at standstill, and vectors OD and OE represent the phase of the resultant grid voltage for one direction of rotation of generator 65, and vectors OF and OG represent the phase of the grid voltage for the opposite direction of rotation of generator 65.

It will thus be appreciated that as the generator 65 is rotated in one direction, the conductivity of one electric valve of valves 5 and 6, such as valve 5, will be increased and the conductivity of the other valve, such as electric valve 6, will be decreased. For the opposite direction of rotation, the conductivity of electric valve 6 will be increased and the conductivity of electric valve 5 will be decreased.

During changing conditions, that is, during variations of the armature voltage of generator 65, the effect of windings 63 and 64 assists changes in the energization of windings 59 and 60 and causes the motor 1 to respond more readily to the variations dictated by generator 65. This forcing or accelerating effect is obtained by virtue of the mutual opposition of windings 59 and 63 and 60 and 64 and by virtue of the connection of the windings 63 and 64 to the armature circuit of motor 1. The armature voltage lags the change dictated by generator 65.

If the control signal, that is the armature voltage of generator 65, is increased in value, the forcing effect of windings 63 and 64, which does not increase as rapidly, allows the windings 59 and 60 to have increased effect temporarily in reactances 48 and 49. When the control signal is decreased, the forcing effect of windings 63 and 64 does not decrease as rapidly and the net result is a greater control signal decrease. As an example, if the forcing effect equals one-half the control effect, at steady state conditions, the following table illustrates the net or resultant effect of the control windings of the reactances:

For 10 volt signal_____ 10— 5=  5
Signal increases to 20 volts_____ 20— 5= 15
Signal stays at 20 volts_____ 20—10= 10
Signal decreases to 10 volts_____ 10—10=  0
Signal decreases from steady 10 volts
  to 0 _____  0— 5=—5

The second control windings 63 and 64 may also be used to adjust the value of the speed of the motor 1 for a particular control signal, that is, for a particular magnitude of output voltage of generator 65. The speed may be adjusted by positioning the contact of the voltage divider 82.

It will, therefore, be appreciated that the speed and direction of rotation of motor 1 rapidly and precisely follow the operation of the hand-cranked generator 65. Windings 63 and 64 force or assist the change dictated by control windings 59 and 60.

In the event the hand-cranked generator 65 is not in condition for operation or in the event it is desired to operate the motor 1 without use of generator 65, switches 72 or 73 and switch 77 may be employed to vary the energization of windings 59 and 60 and thereby control the speed or direction of rotation of motor 1. Under these conditions, the speed at which the motor 1 is rotated may be obtained by operating switch 77.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a dynamo-electric machine, electric translating apparatus connected between said circuit and said machine and comprising electric valve means having a control member for controlling the current conducted thereby, an excitation circuit for impressing on said control member an alternating voltage variable in phase with respect to the voltage of said alternating current circuit and comprising a pair of reactances each having two windings energized from said alternating current circuit and constituting an alternating current bridge, the windings of each reactance constituting opposite branches of the bridge, said reactances each also comprising a control winding and a second control winding, means responsive to a predetermined controlling influence for variably energizing the first mentioned control windings of said reactances, and means responsive to an electrical condition of said machine for variably energizing the second control windings to produce a magnetomotive force always less than that of the associated first mentioned control winding but lagging the time relationship thereto so that the resultant effect in change of the magnetic relation of the reactance is to accelerate the change dictated by the first mentioned control windings.

2. In combination, an alternating current circuit, a dynamo-electric machine, electric translating apparatus connected between said circuit and said machine and comprising electric valve means having a control member for controlling the current conducted thereby, an excitation circuit for impressing on said control member a resultant periodic voltage of variable phase position with respect to the voltage of said alternating current circuit and comprising means for producing an alternating component of voltage of fixed relationship and means for producing an alternating component of variable magnitude and phase position comprising a pair of reactances each having two alternating current windings and each having a control winding and a second control winding, the alternating current windings constituting an alternating current bridge network and the associated alternating current winding of each reactance constituting opposite branches of the bridge network, means for variably energizing the first mentioned control windings in response to a predetermined controlling influence, and means responsive to an electrical condition of said machine for variably energizing said second control windings to produce magnetomotive forces always less than that of the associated first mentioned control windings but lagging in time relation thereto so that the resultant effect in the change in the magnetization of said reactances is to accelerate the change dictated by the first mentioned control windings.

3. In combination, an alternating current circuit, a dynamo-electric machine of the direct current type having an armature winding and a field winding, electric translating apparatus connected between said alternating current circuit and said armature winding and comprising a pair of electric valve means each having a control member, an excitation circuit for impressing on the control members periodic voltages of variable phase displacements with respect to the voltage of said alternating current circuit to control the magnitude and polarity of the average current transmitted to said armature winding and comprising a pair of saturable inductive devices each including an alternating current winding, a direct current exicting winding, a control winding and a forcing winding, the control windings and the associated forcing winding of each of said saturable devices being arranged in opposition, means for variably energizing the control windings to control the phase of said periodic voltages, and means for energizing the forcing windings in a manner to assist the change dictated by the control windings.

4. In combination, an alternating current circuit, a direct current motor having an armature winding and a field winding, electric translating apparatus comprising a pair of electric valves each having a control member for transmitting current to said armature winding and to control the speed and direction of rotation of said motor, an excitation circuit for impressing on the control members periodic voltages of variable phase displacement with respect to the voltage of said alternating current circuit to control the polarity of the resultant average current transmitted to said armature winding by said electric valves and including a pair of saturable inductive devices each having an alternating current winding, a direct current magnetization winding, a control winding and a second control winding, means for supplying a substantially constant current to said exciting windings, means for transmitting variable amounts of unidirectional current to said control windings to control the phase of said periodic voltages, and means for energizing the second control windings in accordance with a predetermined controlling influence derived from said dynamo-electric machine.

5. In combination, an alternating current circuit, a direct current motor having an armature winding and a field winding, electric translating apparatus connected between said circuit and said armature winding and comprising a pair of electric valves each having a control member, an excitation circuit for impressing on the control members periodic voltages of variable phase displacement with respect to the voltage of said alternating current circuit to control the magnitude and polarity of the average current transmitted to said armature winding thereby to control the speed and direction of rotation of said motor and comprising a pair of saturable inductive devices each having an alternating current winding, a direct current exciting winding, a control winding and a second control winding, the respective associated control and second control windings being arranged to offer opposing magnetomotive forces, means for supplying a substantially constant current to the direct current exciting windings, means comprising a hand-cranked direct current generator for producing a control voltage of variable magnitude and polarity to control the speed and direction of rotation of said motor, means for connecting said generator to the control windings, and means for energizing the second control windings in accordance with the armature voltage of said motor.

6. In combination, an alternating current circuit, a direct current motor having an armature winding and a field winding, electric translating apparatus connected to said alternating current circuit and comprising a pair of electric valves each having a control member and arranged to transmit current in opposite directions through said armature winding to control the speed and direction of rotation of said motor, an excitation circuit for impressing on the control members periodic voltages of variable phase displacement with respect to the voltage of said alternating current circuit and including a static impedance type phase shifting circuit comprising an inductive device having a control winding, a hand-cranked direct current generator for producing a control voltage the polarity of which varies in response to the direction of rotation of said generator, means for connecting said control winding to said generator, and means responsive to the voltage impressed across said armature winding by said electric valves to control said inductive device so that the speed and direction of rotation of said motor follows precisely the output voltage of said generator.

7. In combination, an alternating current circuit, a direct current motor having an armature winding and a field winding, electric translating apparatus connected between said alternating current circuit and said armature winding and comprising a pair of electric valves for transmitting current in opposite directions through said armature winding to control the magnitude of the resultant average current transmitted to said armature winding and thereby to control the speed and direction of rotation of said motor, said electric valve means each having a control member, an excitation circuit for impressing on the control members periodic voltages of variable phase displacement with respect to the voltage of said alternating current circuit and comprising a saturable inductive device having an output winding, a control winding and a second control winding, a hand-cranked direct current generator having an armature winding connected to said control winding, and means for energizing said second control winding in accordance with the voltage impressed across the armature winding by said electric valve means.

8. In combination, an alternating current circuit, a direct current dynamo-electric machine having an armature winding and a field winding, electric translating apparatus connected to said alternating current circuit for transmitting power from said alternating current circuit to said armature winding and comprising electric valve means having a control member, an excitation circuit for impressing on said control member a periodic voltage of variable phase displacement with respect to the voltage of said alternating current circuit and including an inductive device having a control winding and a second control winding, a hand-cranked direct current generator for producing a control voltage the polarity of which varies in response to the direction of rotation of said generator for energizing said control winding, and means responsive to the voltage impressed across said armature winding by said electric valve means to control said inductive device so that the speed and direction of rotation of said motor follows precisely the output voltage of said generator, the magnetomotive force of said second control winding being less than that of the control winding.

9. In combination, an alternating current circuit, a direct current motor having an armature winding and a field winding, electric translating apparatus connected between said circuit and said armature winding and comprising a pair of electric valves each having a control member, an excitation circuit for impressing on the control members periodic voltages of variable phase displacement with respect to the voltage of said alternating current circuit to control the magnitude and polarity of the average current transmitted to said armature winding thereby to control the speed and direction of rotation of said motor and comprising a pair of saturable inductive devices each having an alternating current winding, a direct current exciting winding, a control winding and a response winding, the respective associated control and response windings being arranged to offer opposing magnetomotive forces, means for supplying a substantially constant current to the direct current exciting windings, means comprising a hand-cranked direct current generator for producing a control voltage of variable magnitude and polarity to control the speed and direction of rotation of said motor, means for connecting said generator to the control windings, and means for energizing the response windings in accordance with the voltage of said motor so that the effect of the response windings lags the effect of the control windings upon increases in magnitude of said control voltage and also lags the effect of said control windings upon decrease in the magnitude of said control voltage whereby the phase variation of said periodic voltages precisely follows the variations in said control voltage.

GEORGE H. PETTIBONE.